United States Patent

Knop

[11] 4,054,916
[45] Oct. 18, 1977

[54] APPARATUS FOR IMPROVING SHARPNESS WHEN RECORDING CONTINUOUS-TONE PICTURES

[75] Inventor: Hans-Georg Knop, Ascheberg, Germany

[73] Assignee: Dr. -Ing. Rudolf Hell GmbH, Kiel, Germany

[21] Appl. No.: 517,602

[22] Filed: Oct. 24, 1974

Related U.S. Application Data

[62] Division of Ser. No. 365,486, May 31, 1973.

[30] Foreign Application Priority Data

June 2, 1972 Germany ............ 2226990

[51] Int. Cl.² ............ H04N 1/40; H04N 1/46
[52] U.S. Cl. ............ 358/284; 358/75
[58] Field of Search ............ 358/75, 80, 37, 284; 178/6.6 B, 6.6 R, 6.6 DD, 6.7 R, DIG. 25, 7.4

[56] References Cited

U.S. PATENT DOCUMENTS

| | | | |
|---|---|---|---|
| 2,606,245 | 8/1952 | Hall | 358/80 |
| 2,691,696 | 10/1954 | Yule | 358/80 |
| 2,865,984 | 12/1958 | Moe | 358/80 |
| 2,892,887 | 6/1959 | Hell | 178/6.6 B |
| 2,962,548 | 11/1960 | Taudt | 178/6.6 B |
| 3,017,515 | 1/1962 | Welch | 178/DIG. 25 |
| 3,275,741 | 9/1966 | Hughes et al. | 358/75 |
| 3,381,612 | 5/1968 | Lecha | 358/80 |
| 3,450,830 | 6/1969 | Kyte | 358/80 |
| 3,588,322 | 6/1971 | Bartel et al. | 358/75 |
| 3,801,736 | 4/1974 | Kesaka et al. | 358/80 |
| 4,005,475 | 1/1977 | Knop | 358/80 |

Primary Examiner—John C. Martin
Attorney, Agent, or Firm—Hill, Gross, Simpson, Van Santen, Steadman, Chiara & Simpson

[57] ABSTRACT

Improved sharpness is obtained in an arrangement for recording continuous-tone pictures in which electro-optic picture scanning apparatus produces picture signals which are applied to an electro-optic recorder to reproduce the picture on a recording medium. Circuits for generating a sharpness signal and for modulating the sharpness signal in dependence upon the picture content of at least a portion of the picture pattern are provided. The modulated sharpness signal is then superimposed on the picture signals to influence the sharpness of pictures recorded by the recorder.

5 Claims, 4 Drawing Figures

APPARATUS FOR IMPROVING SHARPNESS WHEN RECORDING CONTINUOUS-TONE PICTURES

This is a division of application Ser. No. 365,486, filed May 31, 1973, and is related to U.S. application Ser. No. 549,485, filed Feb. 12, 1975, now U.S. Pat. No. 4,005,485.

BACKGROUND OF THE INVENTION

1. Field of the Invention

This invention relates to a method and an apparatus for improving sharpness when recording half tone pictures, and is more particularly concerned with such a method and apparatus wherein optical/electrical scanning of picture patterns produce picture signals which are superimposed with a sharpness signal that is derived during scanning for increasing sharpness when recording.

2. Description of the Prior Art

Methods and apparatus are known in the art of reproduction technique whereby a single or a multi-colored half tone picture pattern is stretched as a top viewed picture, or as a translucent diapositive on a scanning drum, and is opto/electrically scanned. The scanning takes place in such a way that a dot-shaped light beam is directed onto the picture pattern to scan the picture pattern along the drum in a spiral-like manner by means of rotation of the drum and by means of an axial movement of the light beam. The light which is reflected or transmitted from the picture pattern is separated in multi-color printing by means of dichroic filters into the spectral regions of the basic colors cyan, magenta and yellow, and is transformed by photoelectric converters into electrical signals which constitute color separation signals. These color separation signals then control a recording member, such as an engraving needle or a recording lamp, by means of which the individual color separation signals are reproduced on a recording medium which is stretched on a recording drum. The movement of the recording drum, as well as the movement of the recording member, is synchronous with the scanning drum and with the scanning light beam so that the recording drum and the scanning drum rotate at the same speed or, if enlargement or reduction is desired, the recording speed is faster or slower than the scanning speed for reproduction. The same facts hold true for the relative axial movement of the scanning member with respect to the recording member, and thus to the recording medium.

Since the colors used during the printing process, the printing colors, are incomplete, and since also other parameters occur during the entire reproduction process which influence the final color of the reproduction, the color separation signals are subjected to one or several electronic treatments during transmission from the optical/electrical converter to the recording member, to nevertheless achieve the desired coloring during the printing process. These influences are generally gradation changes, color return and color correction.

Since the scanned picture pattern primarily constitutes a photographic picture which loses part of the sharpness contained in the original picture during development of a film, by subsequent enlargement or by optical printing, several attempts are made to regain the lost sharpness during the reproduction process. In addition to the color separation signals, a second picture signal is derived, which for an increase in sharpness, is again directed to the color recording medium. This picture signal will hereinafter be designated the sharpness signal.

Sharpness signals are provided, according to two principles. In one method, the picture signal which is derived during scanning of the picture pattern is deducted from the color separation signal. To achieve this result, the color separation signal is differentiated once or several times and the reslt in sharpness signal is subtracted from the color separation signal. The resulting signal is subsequently further processed as a sharpened color separation signal.

In another method, a so-called outer field is additionally scanned in addition to the scanning of a sharp point corresponding to the non-sharp masking in the photograph and reproduction technique. The signal which is achieved, and which constitutes the medium luminance of the outer field, is subtracted from the color separation signal. The difference signal is the sharpness signal and is added to the picture signal. A sharper signal is created which is correspondingly further processed during printing.

The method just-mentioned offers the advantage that the lost sharpness is regained; however, there is also the possibility that portions of the picture which were already relatively sharp in the original are reproduced with excessive sharpness. However, if the sharpness is reduced strongly, detailed portions of the picture, such as textiles and ornaments, are not reproduced with sufficient sharpness.

SUMMARY OF THE INVENTION

The present invention has as its primary object the provision of an arrangement for electro-optical reproduction of continuous tone pictures which do not have the aforementioned disadvantages and by means of which improvements in picture sharpness can be carried out separately and differently for individual parts of a picture.

The foregoing object is achieved according to the invention in that the sharpness signal is changed in dependence upon the picture content of the picture pattern before superposition of the sharpness signal with the picture signals.

It is known to direct a sharpness signal to the picture signal with an amplitude which is constant for the entire picture. However, this measure covers the entire picture so that a local change of the picture sharpness is not possible. According to a preferred embodiment of the invention, the sharpness signal is changed by a mask signal which is provided by synchronously scanning a mask with the picture pattern and derived from the picture contents of the picture pattern.

The change of the sharpness signal can be controlled in an advantageous manner by means of a color selection circuit which is controlled by the picture signals and by means of signals which are derived from the contrast of the picture pattern. In this instance, the sharpness signal is preferably diminished in the case of a large contrast of the picture pattern.

A preferred further development of the invention, which in many cases is sufficient, resides in a technique for switching the sharpness signal on and off in dependence on the picture contents of the picture pattern.

An arrangement is provided for the implementation of the method of the present invention comprises an electro-optical scanning device for recording the picture pattern, a device for deriving a sharpness signal and a device for superimposing the sharpness signal over the picture signal prior to recording. According to the invention, this circuit arrangement is characterized in the provision of apparatus for modulating the sharpness signal onto the picture signal in dependence on the picture contents of the picture pattern. This apparatus can be controlled by means of a switching mask and/or a color selection circuit and/or a contrast evaluation circuit. The modulation apparatus can preferably be designed as a switch.

BRIEF DESCRIPTION OF THE DRAWINGS

Other objects, features and advantages of the invention, its organization, construction and operation will be best understood from the following detailed description of a preferred embodiment of the invention taken in conjunction with the accompanying drawings, on which.

DESCRIPTION OF THE PREFERRED EMBODIMENTS

Figure 1:
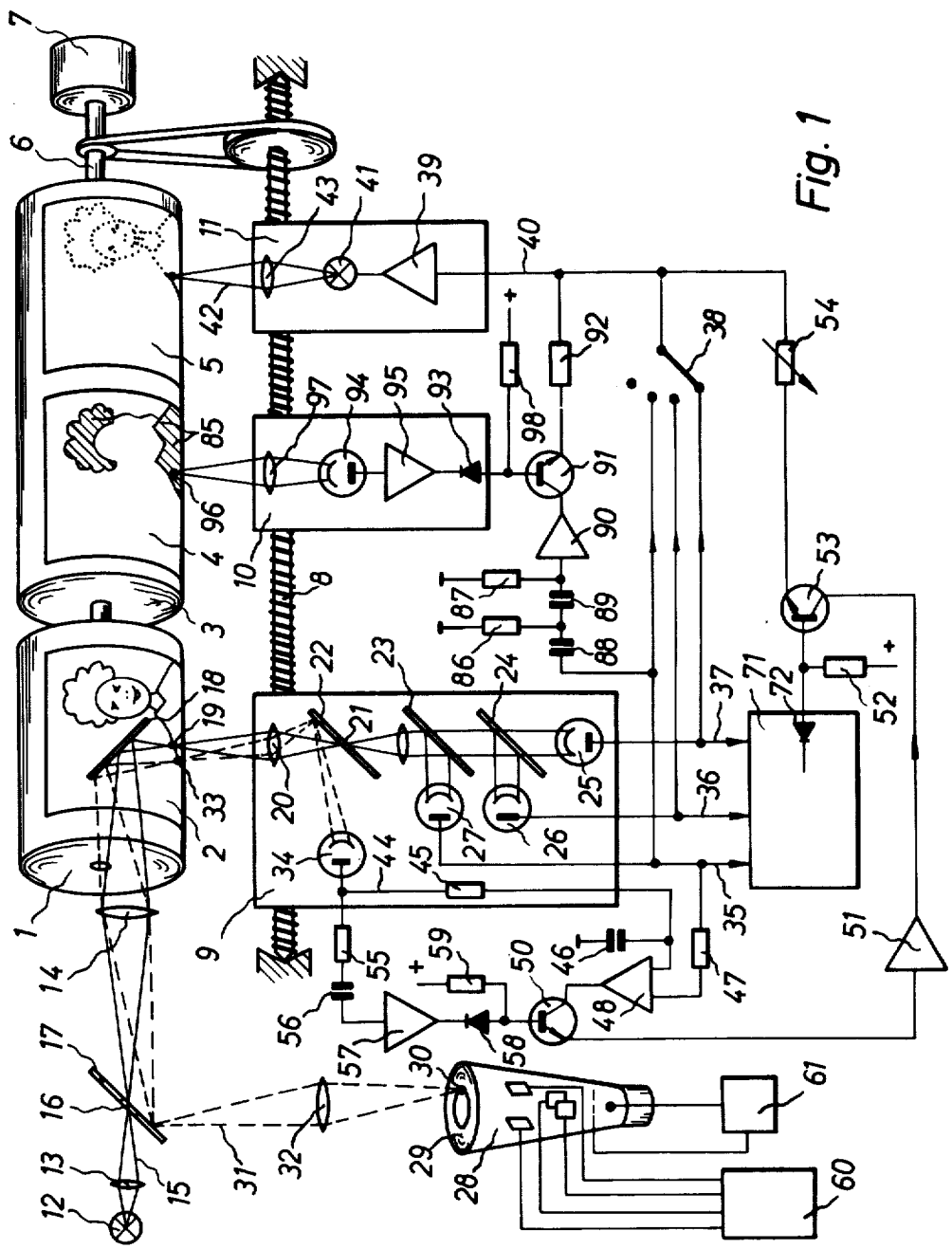
FIG. 1 is a schematic illustration of a reproduction arrangement for recording continuous pictures, specifically showing the derivation of a sharpness signal and several possibilities for influencing the sharpness signal by picture contents of the picture pattern.

FIG. 1 illustrates a scanning drum which has a translucent surface for carrying translucent pictures, for example a diapositive 2. Another drum 3 is provided which serves for stretching and holding of a mask 4 and a recording carrier 5. The drums 1 and 3 are driven by a motor 7 via a shaft 6.

A scanning system 9 is simultaneously driven by the motor 7 via a feed screw 8. The scanning system 9 serves for a scanning of the diapositive 2. Likewise, a scanning system 10, which serves for scanning the mask 4, and a recording system 11, which is assigned for illuminating the recording carrier 5, are driven by the motor 7 via the feed screw 8.

A light source 12 emits a scanning light beam 15 which is directed onto a picture point 19 of the diapositive 2 by way of lens system 13 and 14 through a hole 16 of a mirror 17 and a mirror 18 which is positioned within the interior of the scanning drum 1. The arrangement of the light source 12, the lenses 13 and 14, as well as the mirror 18 are arranged in such a way that the light beam 15 is focused onto the picture point 19 which is to be scanned. After passing through the diapositive 2, the light beam 15, which is modulated with the picture content of the picture point 19, is passed by way of a lens 20 to a color separation system within the scanning system 9. The light beam 15 reaches the color separation system by way of the lens 20 and a hole 21 in a mirror 22. The color separation system comprises dichronic filters 23 and 24 and a plurality of optical-/electrical converters 25, 26 and 27. The scanning light beam 15 is split into three sub-beams which represent the spectral regions of the basic colors, magenta, cyan and yellow, which then accrue at the outputs of the optical/electrical converters as electrical color separation signals which are also referred to as primary color separation signals.

The optical system just-described comprises an additional scanning arrangement for the outer field of the picture point 19 of the diapositive 2. This additional scanning arrangement comprises a cathode beam tube 28 having a screen 29 on which a rotating luminous spot 30 is created which causes a scanning light beam 31 to be directed by way of a lens 32 to the mirror 17. The mirror 17 reflects the beam 31 and directs the same through a lens 14 to the mirror 18 which directs the beam to a picture point 33 which scans the diapositive 2. The picture point 33 circles the picture point 19 in synchronism with the rotation of the dot 30 created on the screen 29 of the picture tube 28. From the picture point 33, the light beam 31, which is modulated with the picture signal contents of the area surrounding the picture point 19, reaches a further optical/electrical converter 34 by way of the mirror 22. The optical/electrical converter 34 generates a corresponding electrical signal, a so-called outer field signal. In order to completely dot-scan and linewise-scan the entire picture surface of the diapositive 2, the scanning drum 1 rotates and simultaneously the scanning system 9 travels parallel to the axis of rotation of the drum 1 as it is driven by the spindle 8 along the drum 1. For this purpose, it is necessary that the light source 12, the lens 13, the mirror 16, the lens 14, the mirror 18, the cathode beam tube 28 and the lens 32 by mechanically fixed to the scanning system 9 in order to be shifted axially with the scanning system 9 along the path defined by the spindle 8. Therefore, it is provided that the diapositive is scanned dot wise and linewise in a spiral line due to the relative movement between rotation of the drum and the entire described scanning system.

The signals created in the optical/electrical converters 25, 26 and 27 which constitute the known primary color separation signals for magenta, cyan and yellow reach the lines 35, 36 and 37. A switch 38 is provided through which the respective color signal to be recorded is connected to the recording system 11. Usually, there is a color correction circuit connected in the lines 35, 36 and 37 which, for reasons of clarity, have been omitted since such apparatus does not contribute to the explanation of the principles of the present invention. The recording of the signals arriving from the switch 38 takes place by means of the recording system 11 which, for example, contains an amplifier 39 controlled by way of the line 40 and which has an output signal connected to control a recording lamp 41 to create a light beam 42 which is focused by means of an object lens 43 onto the recording carrier 5 carried on the drum 3. The recording carrier 5 preferably comprises light sensitive material on which the light beam 42 records a screw-type line due to the relative rotational and axial movement of the drum 3 and the recording system 11, whereby the recorded line accurately corresponds to the scanning of the diapositive 2.

The outer field signal is simultaneously created in an optical/electrical converter 34 during picture scanning and recording. The outer field signal is transmitted by way of a line 44 to an RC filter circuit consisting of a resistor 45 and a capacitor 46. The signal is then applied to a subtracter 48 which has another input connected to the line 35 by way of a decoupling resistor 47. The subtracter 48 is a differential amplifier which has its output connected to the collector-emitter path of the transistor 50 and on through a sign inverter 51 to the collector-emitter path of a further transistor 53 from where it is extended, via a variable resistor 54, to the primary color separation signal on the line 40 as a sharpness signal to increase the sharpness during reproduction. If the collector-emitter path of the transistors 50 and 53 were replaced by conductive sections, this type of signal feeding to the primary separation signals would result in the known lack of sharpness. Deviating from this known condition, in the present invention the transistors 50 and 53 are connected into the signal path of the outer field signal as modulators or signal switches. In case the picture scanning point 33 circles about or scans as an outer field to the picture point 19 a surface of various density, the signal of the optical/electrical converter 34 shows a high frequency alternating amplitude. This signal is directed by way of a resistor 55 and a capacitor 56 to an amplifier 57 which only permits the negative signal amplitude to pass and which is connected to the base of the transistor 50. For adjusting the working point of the transistor 50, a resistor 59 is connected between the base of the transistor and the positive pole of an electrical supply (not illustrated). Similar structure is provided for the transistor 53 wherein a resistor 52 is connected between the base of the transistor and the positive pole of the electrical supply. The negative signal supplied from the diode 58 blocks the transistor 50 whereby the sharpening signal which is received from the optical/electrical converter 34 by way of the RC circuit 45, 46 at the collector of the transistor 50 is not allowed to pass the collector-emitter path of the transistor so that the transistor is blocked. This only occurs if a signal with a high frequency alternating amplitude is supplied by the optical/electrical converter 34, a condition indicating that the outer field about the picture point 19 constitutes an area of varying density.

Figure 2:
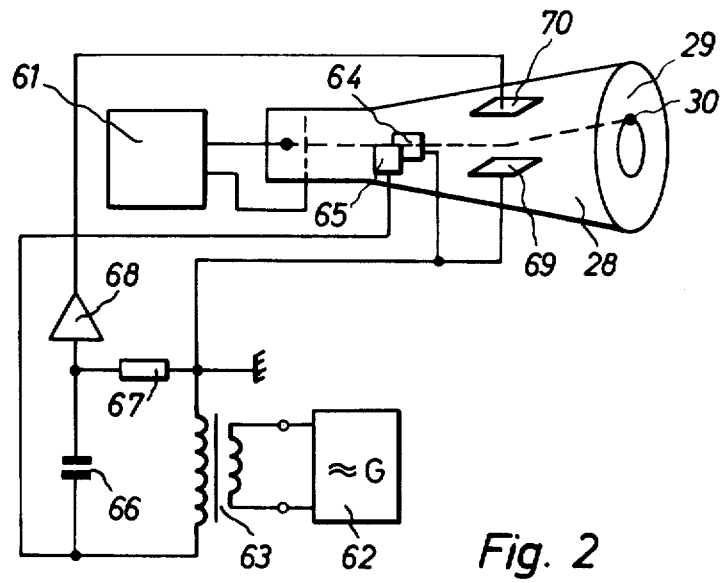
FIG. 2 is a schematic circuit diagram of an exemplary apparatus for rotating a scanning light point by means of an electron beam tube.

If the outer field has a homogeneous density, blockage of the transistor 50 will not occur and the sharpness signal is permitted to traverse the collector-emitter path of the transistor 50. The creation of the outer field signal from which the sharpness increasing signal is derived takes place as mentioned above by way of the rotating luminous point 30 of the cathode beam tube 28. In FIG. 2 a circuit arrangement for carrying out the circular deflection of the electron beam is illustrated. The electron beam tube 28 comprises, as is well known in the art, a picture screen 29 on which the point 30 is displayed, a pair of vertical deflection plates 69, 70 and a pair of horizontal deflection plates 64, 65. An electron beam generating system 61 is connected to the cathode structure of the tube 28 to generate an electron beam as is well known in the art. The control circuit 61 for producing the electron beam has not been illustrated in greater detail since it only contains apparatus for providing constant voltages for adjusting the working point of the cathode beam tube 28. In addition to this structure which is schematically illustrated in FIG. 1, a control circuit 61 is also illustrated for controlling the deflection of the electron beam. In FIG. 2 the control circuit 60 is shown in greater detail as comprising a transformer 63 which is controlled by way of a high frequency generator 62. The transformer 63 includes a secondary winding which is connected to the horizontal (X) deflection plates 64 and 65 of the cathode beam tube 28. In order to achieve a circular deflection of the type of Lissajou figures, an AC voltage which is phase shifted by 90° is derived from the X-deflection voltage by tapping a voltage by way of a capacitor 66 and a resistor 67 from the secondary winding of the transformer 63. This tap voltage is applied to an amplifier 68 and to the vertical (Y) deflection plates 69 and 70 of the cathode ray tube 28. The frequency of the high frequency generator 62 should be a multiple of the picture point scanning frequency so that the outer field is scanned with sufficient speed about the just-scanned picture point.

Another possibility for changing the effectiveness of the sharpness signals should be provided wherein the sharpness signals are switched through depending on a chosen pattern color. It may be desired, for example, to transmit skin colors during the reproduction process without increasing picture sharpness. For this purpose, a color evaluation circuit 71 is provided which functions to emit a negative signal by way of a diode 72 if the chosen color in the picture is scanned. The diode 72 is connected to the base of the transistor 53 which is blocked if the base voltage becomes negative to prevent sharpness signals from passing to the recording system 11 by way of its collector-emitter path.

Figure 3:
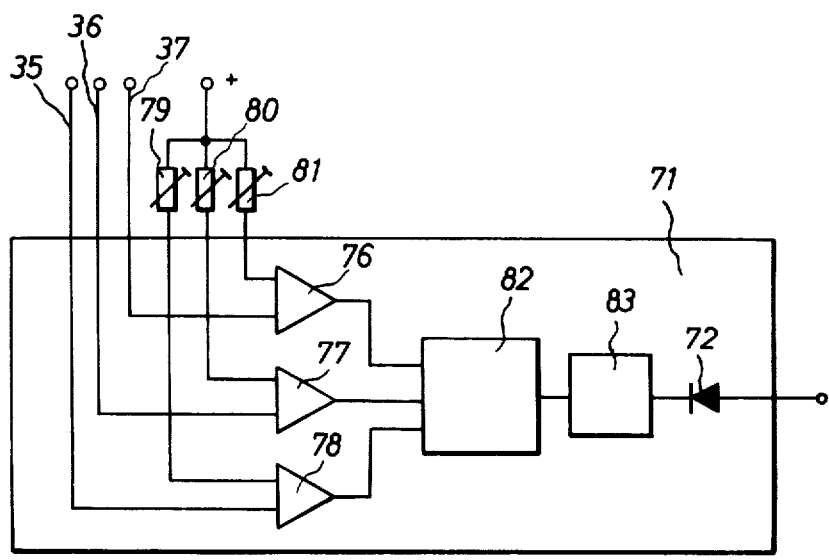
FIG. 3 is a schematic circuit diagram of a color signal detector circuit which may be employed in the apparatus illustrated in FIG. 1.
Figure 4:
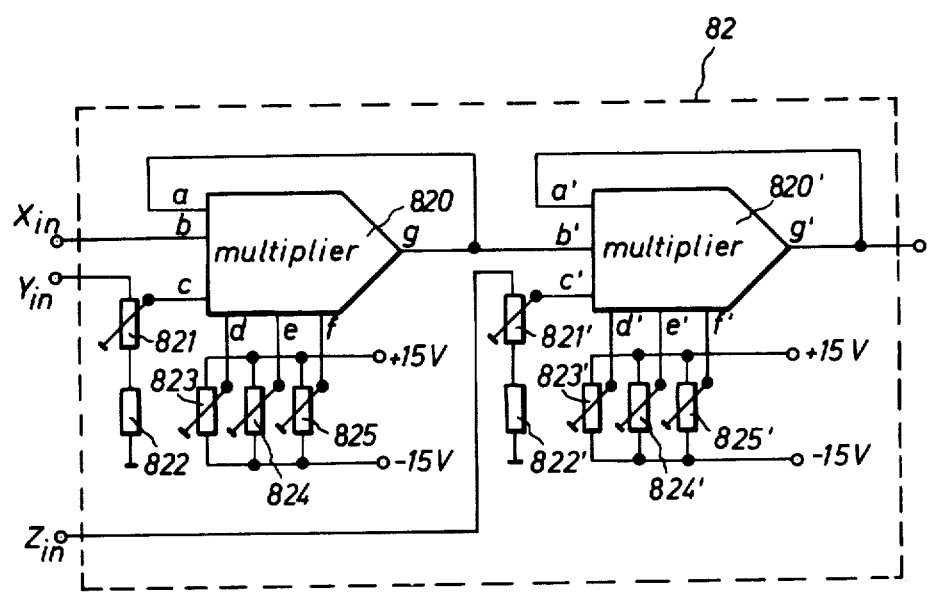
FIG. 4 is a schematic circuit diagram of a multiplier which may be employed in the color detector of FIG. 3.

An exemplary color evaluation circuit 71 is illustrated in greater detail in FIG. 3. The primary color separation signals, magenta, cyan and yellow, reach the color evaluation circuit 71 on the lines 35, 36 and 37. Differences between fixed values $mg_o$, $cy_o$ and $ge_o$ are formed between the respective primary color separation signals magenta, cyan and yellow which are assigned to special characterizing colors. This occurs in that the primary color separation signals are directed in each case to an input of an amplifier 76, 77 and 78 which are connected as differential amplifiers. At the other inputs of the amplifiers 76, 77 and 78, the fixed signal values $mg_o$, $cy_o$ and $ge_o$ are fed by way of respective variable resistors 79, 80 and 81 which are commonly connected to the positive pole of the electrical supply. The outputs of the amplifiers are directed to a multiplication stage 82 which multiplies these signals with each other. The circuit structure of the multiplier 82 is illustrated in FIG. 4. The outputs of the amplifiers 76, 77 and 78 are connected with the inputs $X_{in}$, $Y_{in}$ and $Z_{in}$ of the multiplier stage 82. The multiplier stage 82 comprises two equal multipliers 821 and 822 which are integrated circuits. These integrated multipliers are available from Intersil Inc., 10900 N, Tantau Ave., Cupertino, Ca. 95014 and are described in the "Application Bulletin A 011 —A Precision Four Quadrant Multiplier" by Bell ONEIL, June 1972. An actual circuit correction of the integrated modulator (type 8013) is illustrated in FIG. 8B of the application bulletin.

The output signal of the amplifier 76 is fed to the $X_{in}$ input (terminal b) of the multiplier 820; the output signal of the amplifier 77 is fed to the input $Y_{in}$ and to the terminal c of the amplifier via a voltage divider consisting of the potentiometer 821 which is axially connected to a ground resistor 822. The terminals a and g of the multiplicator are short circuited as shown in FIG. 9B of the application bulletin. The terminals d, e and f of the multiplier are connected to the center taps of ptentiometers 823, 824 and 825 which are respectively connected to supply voltages of +15 V and −15 V.

At the output g of the multiplier 820' appears the quantity $(X_{in} \cdot Y_{in})/10$ i.e. the multiplication of the output signals of the amplifiers 76 and 77.

This signal is again multiplicated with the output signal of the amplifier 78 by way of the multiplier 820'. The output of the multiplier 820 is connected to the input $b'$ of the multiplier 820' and the output signal of the amplifier 78 is fed to the terminal $d$ of the multiplier 820' via the potentiometer 821' which is connected to a grounded resistor 822'. The connection of the terminals $a'$ and $g'$ and the wiring of the terminals $d'$, $e'$ and $f$ by the potentiometers 823', 824' and 825' is equal to the wiring of the multiplier 820. At the output terminal $g'$ of the multiplier 820' appears a signal which is the product of the output signals of the amplifiers 76, 77 and 78.

If special color signals mg, cy and ge which are almost equal to the adjusted fixed signal values $mg_o$, $cy_o$ and $ge_o$ are received by the color evaluation circuit 71, the signal occurring at the output of the multiplication stage 82 is at a minimum value. This signal is inverted by the amplitude inverter 83 into a maximum negative value signal and is passed onto the diode 72 which then blocks the base of the transistor 53 whereby a sharpness signal is not passed on to the recording system 11.

The effect which is therefore achieved provides that, for example, skin colors which are scanned in the picture can be recorded without increased sharpness so that skin tones can be recorded in a more subdued manner.

It is a further preferred possibility to influence the sharpness signal in accordance with the picture contents that are synchronous and register in a stable manner with the original picture pattern. For this purpose, a mask is scanned to provide scanning signals for influencing the sharpness signals. More specifically, the drum 3 carries a mask 4 which is scanned by means of the scanning system 10. The picture parts 85 which are colored black in the mask are to be recorded under the influence of the sharpness signal, that is they are to be more sharply reproduced. The sharpness signal is derived from a primary color separation signal supplied by the optical electrical converter 27 to the line 35. The line 35 is further connected to a pair of RC circuits where it is twice differentiated. These RC circuits comprise a first resistor 86 and a first capacitor 88 and a second resistor 87 and a second capacitor 89, respectively. The second RC circuit is connected to a sign inverter 90 which is, in turn, connected to the collector of a transistor 91. The transistor 91 is effective as a signal modulator or signal switch which controls transmission of the twice differentiated color separation signal to the line 40 and the recording system 11 by way of a resistor 92. The base of the transistor 91 has its working point adjusted by means of a resistor 98 which is connected to the positive pole of the electrical supply. The base of the transistor 91 is also connected to the anode of a diode 93 of the scanning system 10. The light beam for scanning the mask 4 is not illustrated in order to avoid confusion in the drawing. For this purpose, however, an arrangement can be used as was already described in connection with the light source 12, the lenses 13 and 14 and the mirror 18. This beam creation system is also moved corresponding to the axial shifting of the scanning system 10 as it is driven by the spindle 8 in the axial direction along the mask 4. The light beam passes from the scanned point 96 of the mask 4 through a lens system 97 to an optical/electrical converter 94 which generates signals in accordance with the mask pattern.

The sharpness signal can only pass the transistor 91 if the signal created in the scanning head 10 is small, which means that black picture parts are scanned.

The principle along which the invention is based, namely to influence the sharpness signals in dependence on the picture contents, is not limited to the prior described coupling possibilities. Signals which are produced in a different manner can also be used. For example, the picture point 33 scanning the outer field can also be created by an even, constant surface illumination. For example, a geometric form of illumination may be employed and may be shaped as a ring, star or sector. In the case of the sector-shaped breakdown, the individual sectors are separated at the location of the mirror 22 and are passed on to, for example, four optical/electrical converters.

If the smallest signal created is subtracted from the largest signal created, a contrast increasing signal will also be provided which can be directed by way of the signal switch or signal modulators 50, 53 or 91 to the signal to be recorded by way of the line 40.

Although I have described my invention by reference to particular exemplary embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. An arrangement for improving sharpness in the recording of a continuous-tone pictures, comprising: electro-optic picture scanning means for scanning a picture to produce picture signals; a recording medium; electro-optic recording means connected to said picture scanning means and responsive to said picture signals to produce said picture on said recording medium; means for generating a sharpness signal; modulating means for modulating said sharpness signal in dependence upon at least a selected portion of the picture pattern being scanned for its characteristics; control means for generating a control signal for influencing the modulation of said sharpness signal; and means for superimposing said modulated sharpness signal and said picture signals to influence the sharpness of pictures recorded by said recording means.

2. An arrangement according to claim 1, wherein said control means includes a color selection circuit connected to said picture scanning means, said picture scanning means further comprising means for generating color separation signals representing a scanned color; said color selection circuit includes means for comparing said color separation signals with predetermined signals representing a color to be selected and means for generating said control signal for influencing the modulation of said sharpness signal when said color is selected.

3. An arrangement according to claim 1, wherein said control means includes a contrast evaluation circuit for generating said control signal for influencing the modulation of said sharpness signal.

4. An arrangement according to claim 1, wherein said modulating means includes a switch for connecting and disconnecting the sharpness signal with respect to said recording means in response to said control signal.

5. An arrangement for improving sharpness in the recording of continuous-tone pictures, comprising: electro-optic picture scanning means for scanning a picture to produce picture signals; a recording medium; electro-optic recording means connected to said picture scanning means and responsive to said picture signals to produce said picture on said recording medium; means for generating a sharpness signal; modulating means for modulating said sharpness signal in dependence upon the picture content of at least a portion of the picture pattern being scanned; control means for generating a control signal for influencing the modulation of said sharpness signal; and means for superimposing said modulated sharpness signal and said picture signals to influence the sharpness of pictures recorded by said recording means, said control means including a picture pattern mask and means for scanning said mask to generate said control signal for influencing the modulation of said sharpness signal.

* * * * *